United States Patent [19]

Protze

[11] 4,051,466
[45] Sept. 27, 1977

[54] ARRANGEMENT FOR DETECTING THE PRESENCE OF SNOW, ICE AND OTHER FREEZING PRECIPITATION, PARTICULARLY ON RAILWAY TRACK STRUCTURES, AND THE LIKE

[75] Inventor: Karl-Heinz Protze, Bickenbach, Germany

[73] Assignee: Eltra KG Leicht & Trambauer, Pfungstadt, Germany

[21] Appl. No.: 595,219

[22] Filed: July 11, 1975

[30] Foreign Application Priority Data

July 12, 1974 Germany .......................... 2433523

[51] Int. Cl.² ............................................ G08B 21/00
[52] U.S. Cl. .................................. 340/234; 104/279;
246/428; 340/22; 340/47; 340/417
[58] Field of Search .............. 340/234, 227 R, 22,
340/47, 417; 246/428; 104/279

[56] References Cited

U.S. PATENT DOCUMENTS

| 1,957,977 | 5/1934 | Packer | 246/428 |
|---|---|---|---|
| 3,157,800 | 11/1964 | Burwell | 340/234 |
| 3,440,396 | 4/1969 | Greene | 340/234 UX |

Primary Examiner—John W. Caldwell, Sr.
Assistant Examiner—Daniel Myer
Attorney, Agent, or Firm—Michael J. Striker

[57] ABSTRACT

The arrangement includes at least one first and at least one second electrode positioned one above the other and spaced from each other in the vertical direction by at least one respective interelectrode gap which can be bridged over by snow, ice and other forms of freezing precipitation to produce an interelectrode gap resistance decrease. A detecting circuit is electrically connected across the electrodes and is operative for detecting the bridging of the interelectrode gap by snow, ice or other forms of freezing precipitation by detecting the interelectrode gap resistance decrease resulting therefrom.

4 Claims, 4 Drawing Figures

ARRANGEMENT FOR DETECTING THE PRESENCE OF SNOW, ICE AND OTHER FREEZING PRECIPITATION, PARTICULARLY ON RAILWAY TRACK STRUCTURES, AND THE LIKE

BACKGROUND OF THE INVENTION

The invention relates to an arrangement for indicating the presence of snow and ice accumulations, particularly on road surfaces, railway track structures, and the like.

More specifically, the invention relates to arrangements of that type and comprised of two spaced electrodes separated from each other by an interelectrode gap which is open in downwards direction and further comprised of a circuit which responds to the establishment of a preselected electrical resistance between the two electrodes.

Arrangements of the type in question are operative for generating an indicating signal and/or activating heating devices when an accumulation of snow or ice forms. It is important that these arrangements of capable of detecting all types of freezing precipitation, such as snow, ice, glazed frost, hail, sleet, glazed ice forming around physical objects, frozen fog droplets, and the like.

The known arrangements have the disadvantage that they cannot distinguish between simple rain and other forms of precipitation such as snow crystals, ice, sleet, hail, and also fog which can lead to the formation of frost and glazed ice. The reason for this is that, even in the positive temperature range (above 0° C), precipitation in the form of snow, sleet and hail can occur, so that the thawing and/or indicating arrangement must be designed to be responsive to precipitation in at least the very bottom of the positive temperature range, in addition to of course being responsive to precipitation in the negative temperature range. Evidently, however, in the positive temperature range, precipitation will also and indeed more often take the form of simple rain which, although it does not lead to the formation of ice, nevertheless and undesirably causes the indicating and/or defrosting arrangement to respond. Particularly when the precipitation detection initiates the operation of a heating device, for example for the purpose of melting the freezing precipitation on a surface of a highway or for melting glazed ice covering a railway track switch, the amount of energy expended in the heating operation is quite considerable and accordingly completely unjustifiable if in fact the precipitation which has been detected is merely simple rain.

When the indicating and/or defrosting arrangement is to be used for road pavements, the two electrodes are horizontally spaced apart by an open interelectrode gap whose open side faces downwards. The two electrodes and the interelectrode gap can be considered to be arranged one next to the other in the horizontal direction. As a result, such as electrode arrangement can be built into the road pavement with the upper surface of the electrode arrangement flush with the road surface, so that traffic can travel over the electrode arrangement unimpeded.

However, that electrode arrangement, although advantageous for incorporation into a road pavement, is not particularly suited for use in railway track constructions, because in the latter context the possibility of making the upper surface of the electrode arrangement flush with the surface of the earth is not a requirement and because the expense and trouble involved in such flush installation can be dispensed with without creating any difficulties.

Furthermore, with that electrode arrangement, another problem resides in the fact that the railway track roadbed holds the water resulting from the melting of the freezing precipitation, consequently, if the electrode arrangement is embedded in the track roadbed flush with the upper surface of the roadbed, the water held by the roadbed will surround the precipitation-detecting electrode arrangement; accordingly, it becomes necessary either to somehow lead this water away or else to somehow cause it to evaporate.

Moreover, in the event of snow drift accumulations, there will be a marked tendency for the snow to accumulate alongside the rails of the railway track, due to their elevated position relative to the roadbed and the ties. The aforementioned horizontal disposition of the electrodes of the precipitation-detecting arrangement in no way takes this peculiarity into account.

SUMMARY OF THE INVENTION

It is the general object of the invention to provide a detector arrangement for freezing precipitation, of the general type discussed above, but so designed as to be easier and less expensive to manufacture and install, and so designed as to better take into account the requirements involved in the installation of such precipitation detectors in railway track constructions, and the like.

These objects, and others which will become more understandable from description, below, of preferred embodiments, can be met, according to one advantageous concept of the invention, by disposing the electrodes of the precipitation detector, not spaced apart from each other in the horizontal direction by the interelectrode gap, but instead spaced apart from each other in generally vertical direction by an interelectrode gap, and by using a lower electrode structure having an upper surface serving as a run-off surface, for example an inclined surface.

Advantageously, the inclination of the run-off surface constituted by the upper surface of the lower electrode structure, and the spacing between the electrodes, are so selected that rain water can drop through and run off the electrode structure unimpeded and without producing a drop in the resistance across the interelectrode gap.

If the freezing precipitation falls upon the electrode arrangement in the form of snow, hail or sleet, or if it is blown by the wind onto the electrode arrangement in the form of snow, it will accumulate upon the upper surface of the lower electrode structure and establish an electrically conductive connection across the interelectrode gap. An electrically conductive connection will likewise be established in the event that a bridge of frozen fog droplets or ice forms between the two electrodes. With this expedient, a single measurement suffices to positively ascertain the presence of freezing precipitation, as opposed to non-frozen precipitation, i.e., simple rain water. Accordingly, the precipitation detector can be of very simple construction and therefore be made comparatively unsusceptible to malfunction. Auxiliary temperature detectors, and other auxiliary equipment provided for the purpose of determining, as a separate step, whether the detected precipitation is simple rain water or in fact freezing or frozen precipitation, need not be employed.

Advantageously, in order to maximize the sensitivity of the inventive precipitation detector, the electrodes are comprised of a plurality of bars or plates, disposed parallel to each other, disposed in a star arrangement, or disposed in a fan-like arrangement, above the upper side of the lower electrode structure, this upper side being inclined, conical, of saddle-shaped configuration or otherwise configured or designed to effect the run-off of rain water.

Advantageously, the circuit connected to the electrode structure of the inventive freezing-precipitation detector includes a time-delay switch device operative for preventing the generation of a freezing-precipitation signal in response to short-lasting decreases in the resistance across the gap between the two electrodes, such as could be produced by the splashing or spraying of water onto the precipitation detector, or other causes.

It may be that the precipitation detector is employed to automatically activate a heating device mounted on a rail or switch of a railway track construction. When the heating device for the rail or switch is activated, it melts the accumulated snow or ice on the adjoining section of the rail or switch. However, practical problems of installation may necessitate location of the precipitation detector at a distance from the heating device for the rail or switch. Accordingly, it could occur that the freezing precipitation detected by the detector would not be melted even after the freezing precipitation on the rail or switch has in fact melted. If this were the case, the precipitation detector would keep the heating device for the rail or switch activated unnecessarily, resulting in a considerable waste of electrical energy. To avoid this, the invention contemplates associating with the precipitation-detecting electrode arrangement a heating arrangement operative, in automatic response to detection of freezing precipitation, for heating the immediate vicinity of the precipitation detector, so as to cause the accumulated precipitation in that vicinity to melt. If a separate heating device is employed for melting the snow or ice on the rail or switch, as just described, then the concurrent melting of the snow or ice detected by the detector proceeds more or less in correspondence to the snow or ice actually posing the problem.

The use of a heating device for the specific purposes of melting the snow or ice in the interelectrode gap can be avoided if, according to an advantageous concept of the invention, the lower electrode structure is of clamp-like configuration and secured to the foot portion of a track rail or a rail section of a track switch is heating-exchanging relationship therewith, because then the heat transmitted to the rail or switch by the heating device therefor will be in part transmitted to the precipitation detector.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
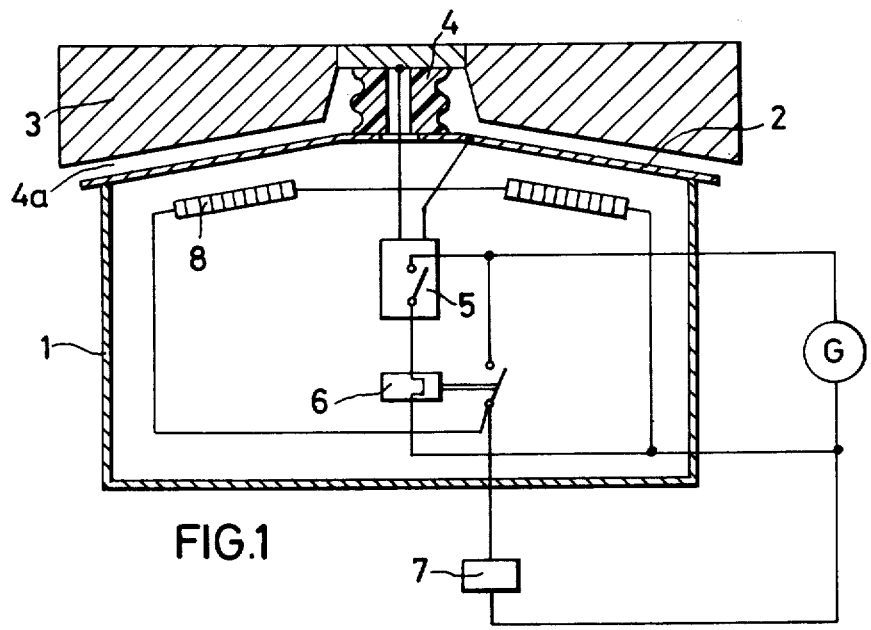
FIG. 1 is a vertical section through a first embodiment of the invention, the section being taken along the section line shown in FIG. 2.
Figure 2:
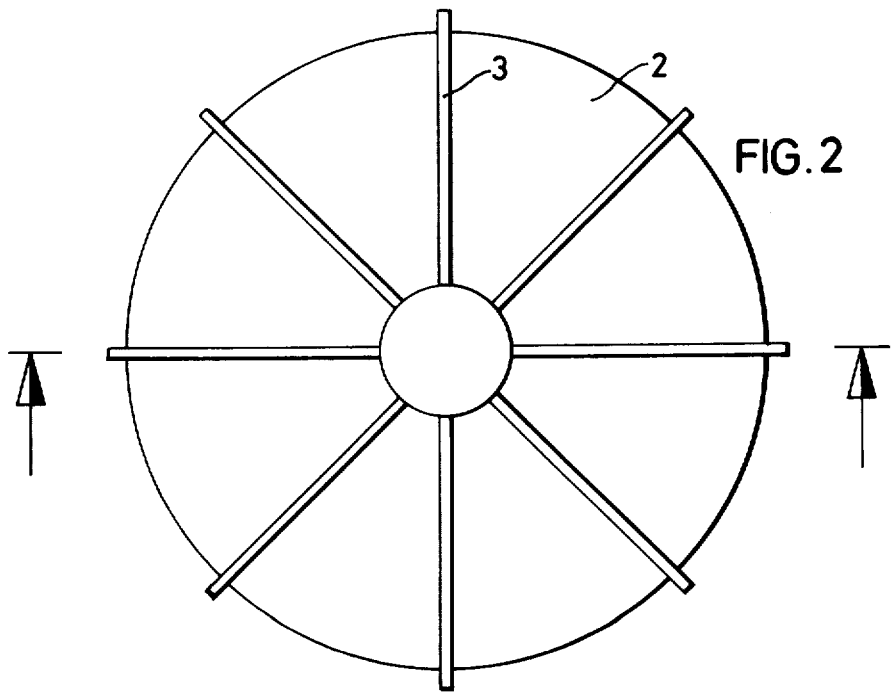
FIG. 2 is a top view looking down upon the structure depicted in FIG. 1.

FIGS. 1 and 2 depict a first embodiment of the invention. The illustrated freezing-precipitation detector is comprised of a housing 1 having a flattened conical roof 2 constituting one of a pair of electrodes. Mounted on the flattened central portion of the conical roof 2 is an insulator body 4. Carried by insulator body 4 is a star-shaped second electrode 3, the star-shaped configuration of which is best seen in FIG. 2. The star-shaped electrode 3 is supported by insulator body 4 at such a height as to form a gap 4a between the lower edges of the vanes of star-shaped electrode 3 and the upper surface of the conical electrode 2. The length of the gap 4a, measured in axial direction, is so selected that rain water can drip down from the electrode 3 to the electrode 2 unimpeded, without dangling from the lower edges of the vanes of electrode 3 in the form of drops suspended between such lower edges and the electrode 2 and accordingly not bridging the interelectrode gap 4a for relatively protracted periods of time. The conically configurated electrode 2 slopes downwards and outwards at such an angle as to ensure that rain water can run off freely.

The electrodes 2 and 3 are connected by respective conductors to a switching device 5 responsive to the interelectrode gap resistance decrease which occurs when freezing precipitation bridges the interelectrode gap 4a. Located beneath the conical electrode 2 is a heating element 8 energizable for the purpose of melting the snow or ice from the electrodes.

In the illustrated exemplary embodiment, the switching device 5, in response to the aforementioned interelectrode gap resistance decreases activates an adjustable time-delay switching device 6, for example an adjustable thermal relay such as a bimetallic-strip relay. Upon elapse of the preselected time interval, the activated thermal relay 6 closes the current paths of the heating element 8 and of an indicator 7, connecting the latter across a voltage source G. The purpose of the time-delay switching device 6 is to prevent short-lasting electrode gap resistance decreases, such as those resulting from splashes of rain water or street water, from triggering the freezing-precipitation indication.

In place of the indicator device 7, or in conjunction with it, there may be provided a separate heating device for heating that object or structure whose cover of snow or ice actually constitutes the problem which necessitates the use of the freezing-precipitation indicator of the invention. For example, the separate heating device may be activatable for the purpose of heating the pavement of a road or the railway switch or railway track rail of a railroad. In the event that separate heating devices are used for melting the ice or snow filling the interelectrode gap 4a and for melting the ice of snow accumulated on the object to be kept free of ice and snow, then the two heating devices are so designed that the melting of the ice or snow filling the interelectrode gap 4a will lag behind the melting of the ice of snow accumulated on the object in question. When all the ice or snow has been melted, the energization of the two heating devices will be automatically discontinued.

The freezing-precipitation detector of FIGS. 1 and 2 is rotation symmetric. The star-shaped fan-like construction of the electrode 3 (particularly evident in FIG. 2) presents a face to snow blown by the wind from any direction, so that the accumulation of wind-blown snow or the like in the interelectrode gap 4a will be the same irrespective of the direction from which the snow is blown.

Figure 3:
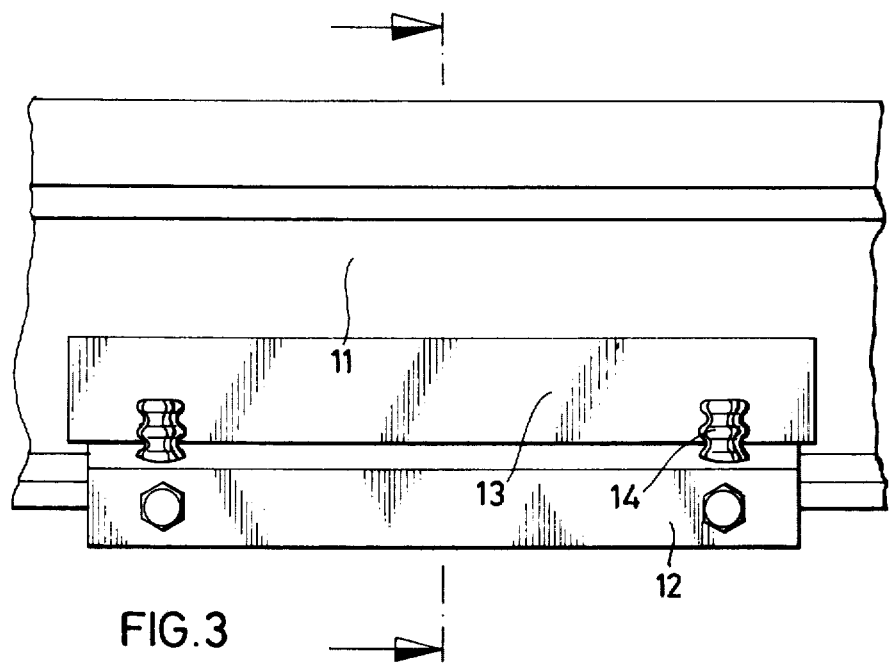
FIG. 3 is a side view of a second embodiment of the invention, adapted for being secured to the side of a railway track or switch rail.
Figure 4:
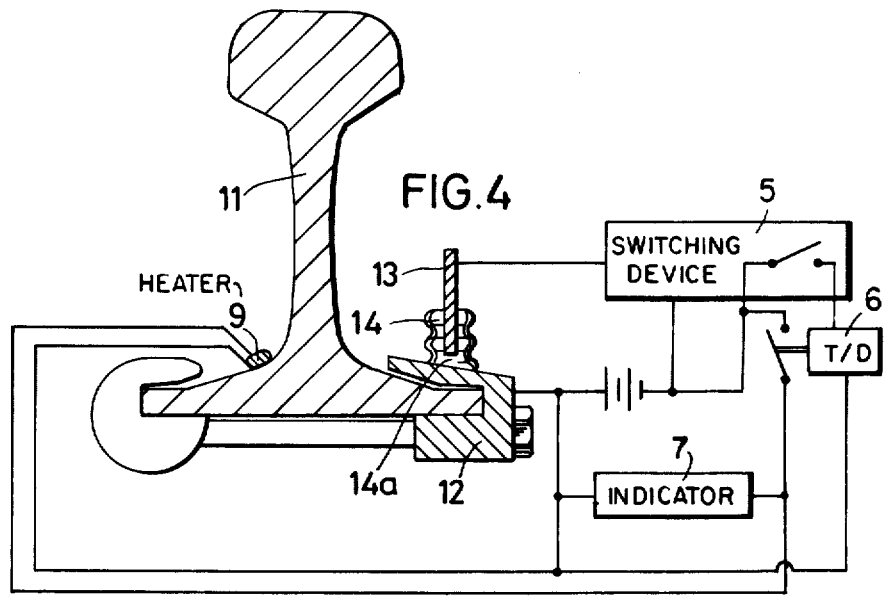
FIG. 4 is a section through the structure depicted in FIG. 3, taken on the section line indicated in FIG. 3.

FIGS. 3 and 4 depict a second embodiment of the invention. The freezing-precipitation detector of FIGS. 3 and 4 is adapted for direct mounting on the foot of a railway track rail. The electrode 12 is of generally clamp-like configuration and has a sloping upper side. In the illustrated embodiment, it is mounted directly on the foot of a track rail and accordingly is in heat-exchanging relationship with the track rail. The second electrode 13 is supported on-end by insulator bodies 14 mounted on the sloping upper side of the first electrode 12. There is accordingly defined intermediate the electrodes 12 and 13 an interelectrode gap 14a running the full length of the electrode 12. In the embodiment of FIGS. 1 and 2 there were provided two heating devices, one for melting the ice or snow on the object of concern, such as the railway track structure, and the other for melting the ice or snow on the precipitation detector itself. In contrast, in the embodiment of FIGS. 3 and 4, a separate heating device for melting the ice or snow on the precipitation detector itself is not required, when the precipitation detector is in heat-exchanging relationship — e.g., in direct contact — with the object which is electrically heated by the main heating device, for example the flat-tube heating element 9 which in the manner already described is activated and deactivated by the precipitation detector.

With the disclosed freezing-precipitation detector it is possible to detect rain solidifying to the ice upon the cold road surface or railway track rails and also fog of the type which can lead to the formation of ice or frozen fog droplet structures.

The various inventive expedients are advantageously applied where the timely detection of solid precipitation is required and also where the automatic activation of heating devices for melting snow or ice accumulations is necessary.

It will be understood that each of the elements described above, or two or more together, may also find a useful application in other types of constructions and circuits differing from the types described above.

While the invention has been illustrated and described as embodied in a two-electrode freezing-precipitation detector, as opposed to a detector wherein one or both electrodes in comprised of a plurality of discrete part electrodes, or a detector provided with a plurality of pairs of electrodes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for detecting the presence of snow, ice and other forms of freezing precipitation, particularly on road surfaces and railroad track structures, comprising, in combination, at least one first and at least one second electrode positioned one above the other and spaced from each other in the vertical direction by at least one respective interelectrode gap which can be bridged over by snow, ice and other forms of freezing precipitation, wherein the lower of said electrodes has the configuration of a clamp adapted to be secured to the foot portion of a railway track rail and both of said electrodes normally being at ambient temperature; and circuit means electrically connected across said electrodes and operative for detecting the bridging of the interelectrode gap by snow, ice or other forms of freezing precipitation by detecting the interelectrode gap resistance decrease resulting from such bridging of the interelectrode gap, the lower of said electrodes being provided with a sloping run-off surface for effecting the run-off or rain water falling upon said lower electrodes, whereby to prevent rain water from accumulating within said interelectrode gap and activating said circuit means.

2. The arrangement defined in claim 1, wherein said circuit means comprises switch means operative for undergoing a change of state in response to the detection of said interelectrode gap resistance decrease, indicating means activatable for providing an indication of the presence of freezing precipitation, and time-delay means connected between said switch means and said indicating means and operative for activating said indicating means in response to a change of state of said switch means but only after the elapse of a preselected time delay, whereby to prevent activation of said indicating means in response to shortlasting interelectrode gap resistance decreases attributable to sprayed water, splashed water, and the like.

3. The arrangement defined in claim 1, wherein said circuit means comprises indicating means activatable for providing an indication of the presence of freezing precipitation, and time-delay means connected to said indicating means and operative for activating said indicating means in response to detection of said interelectrode gap resistance decrease but only after the elapse of a preselected time delay, whereby to prevent activation of said indicating means in response to short-lasting interelectrode gap resistance decreases attributable to sprayed water, splashed water, and the like.

4. The arrangement defined in claim 1, the upper one of said electrode being a flat bar located in a vertical plane, the bottom edge of the flat bar being positioned above the sloping run-off surface of the lower electrode and defining therewith a vertical and generally planar interelectrode air gap, the lower electrode being of thermally conductive material so that when clamped to the foot portion of a railway track rail the lower electrode will be in thermally conductive engagement therewith, the upper electrode being mounted upon the lower electrode without a surrounding housing so as to be substantially completely exposed to the elements, the upper electrode being so positioned upon the lower electrode that when the latter is clamped to the foot portion of a railway track rail the upper electrode together with such rail forms a collection chamber for falling and drifting snow.

* * * * *